Patented Nov. 8, 1949

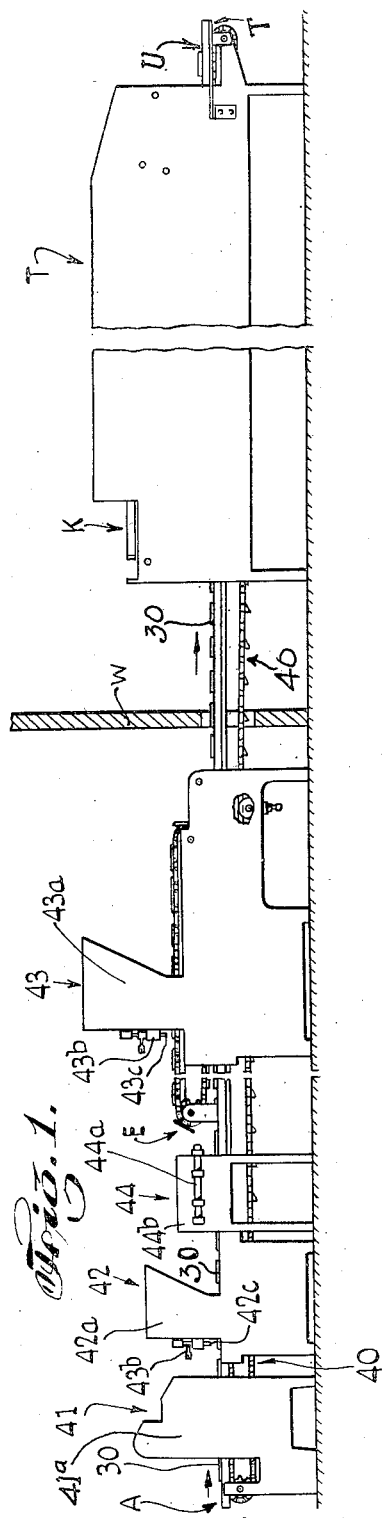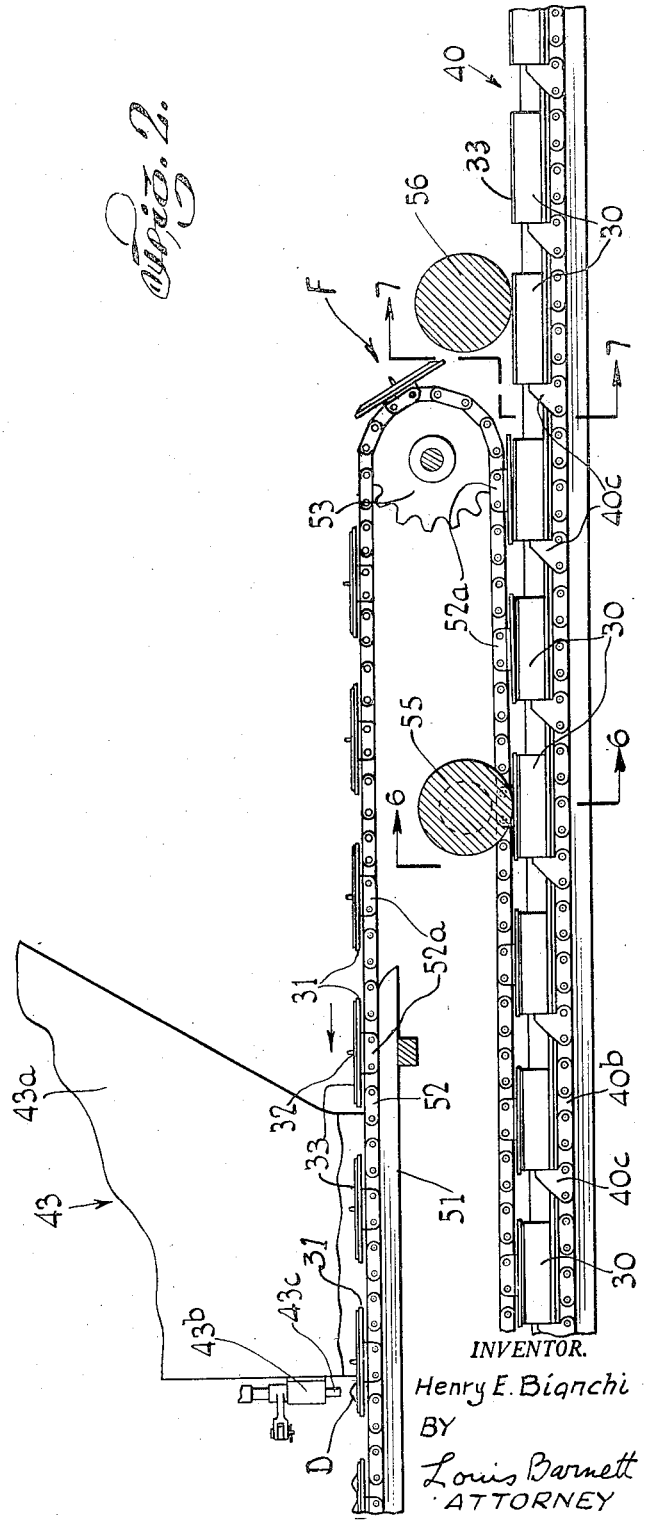

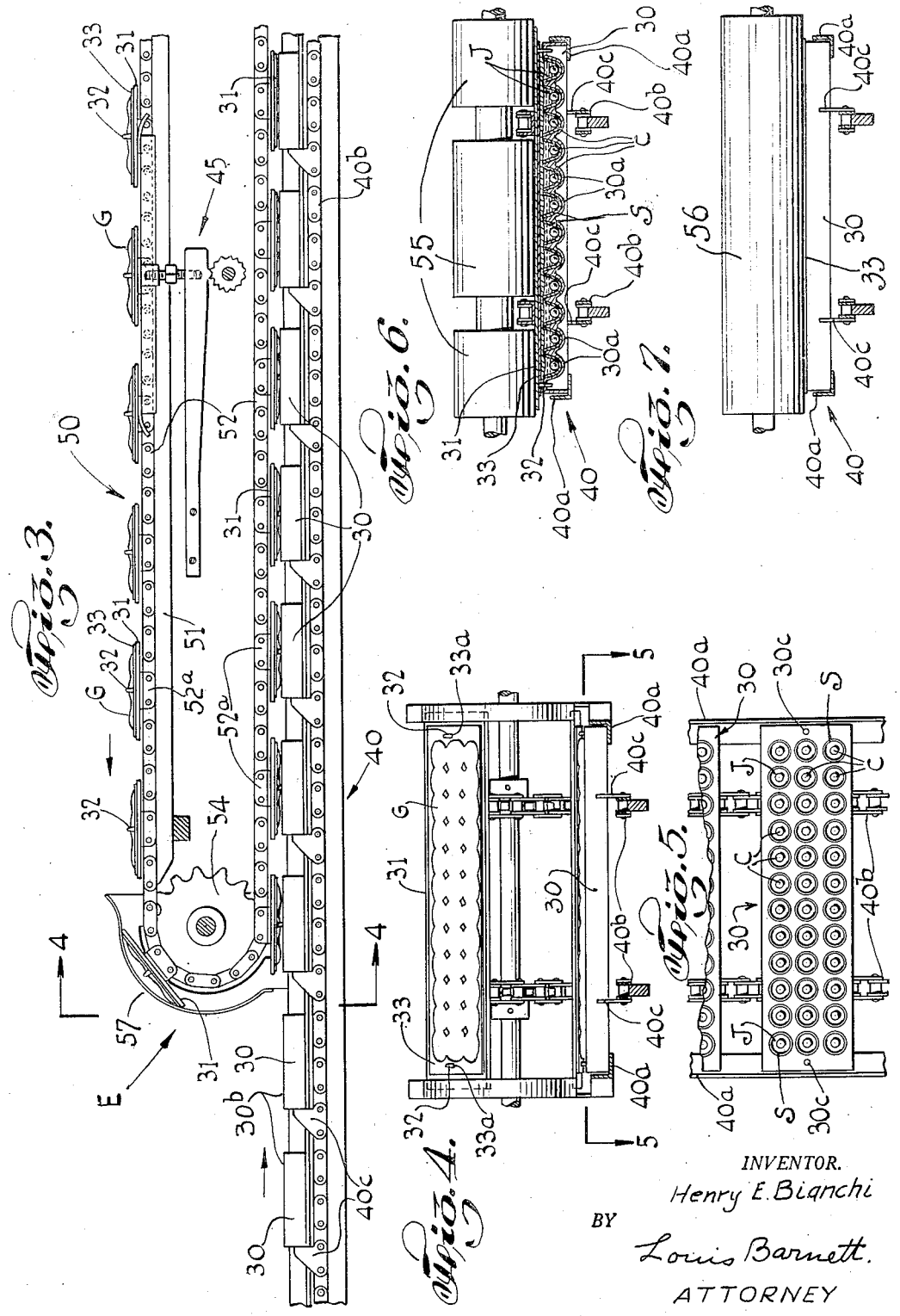

2,487,417

UNITED STATES PATENT OFFICE 2,487,417

CONFECTION MAKING APPARATUS

Henry E. Bianchi, Elmhurst, N. Y., assignor to G. Cella, Inc., New York, N. Y., a corporation of New York Application December 23, 1944, Serial No. 569,524

13 Claims. (Cl. 107—1)

This invention relates to confection manufacturing apparatus and more particularly is directed to improvements thereof for enrobing liquids, or preserved fruits in juices or syrups in chocolate shells.

Among the objects of the invention is to generally improve apparatus of the character described whereby fewer and simpler parts are required which shall operate with less labor for continuous operation, and which shall be practical and efficient to a high degree in use. This invention may be adapted for incorporation in such apparatus as shown and described in applicant's Patent No. 2,163,580, granted June 27, 1939, for reducing the labor requirements and for more efficient operation.

Other objects of the invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawing, in which is shown one possible illustrative embodiment of this invention:

Fig. 1 is a front elevational view of an apparatus constructed to incorporate the invention.

Figs. 2 and 3 are enlarged fragmentary elevational views, showing partly in section the forward and rearward portions, respectively, of the closure bottom chocolate layer applying mechanism.

Fig. 4 is an end view of the rearward portion of said layer applying mechanism as seen from line 4—4 in Fig. 3.

Fig. 5 is a detailed fragmentary view showing the multi-cavity mold in position on the conveyor before the closure bottom chocolate layer is applied, as seen from line 5—5 in Fig. 4, and Figs. 6 and 7 are detailed cross-sectional views taken on lines 6—6 and 7—7, respectively, in Fig. 2, in Fig. 6, showing a cross-sectional view of the multiple-cavity mold in position on the conveyor after the closure bottom layer is applied.

Referring in detail to the drawing, the invention is shown installed in a complete confection apparatus, similar to that disclosed in my Patent No. 2,163,580, except as herein described with respect to the construction and incorporation of the improved mechanism for applying closure bottom chocolate layers G on filled shells S which are carried in multi-cavities 30a of molds 30, the latter preferably being made of metal in the form shown in Figs. 5 and 6, with 36 cells or cavities 30a in 3 rows or lines.

Said apparatus when incorporating the invention as shown in Fig. 1, includes a horizontally disposed elongated endless conveyor 40 having spaced stationary side bars or rails 40a, and spaced sprocket chains 40b movably mounted between said rails 40a. Chains 40b may be intermittently driven through motor or other suitable power means (not shown) in the well understood manner. Said conveyor 40 may have mounted thereon in spaced relation and co-operatively driven therewith, a fruit feeder 41 for supplying cherries or like pieces of fruit, a syrup or juice supplier 42, and a chocolate bud depositor 43, an oven heater 44 being provided between the juice supplier 42 and the chocolate bud depositor 43, as for example as shown in Fig. 1.

The fruit feeder 41 may be of any conventional make for feeding cherries C from a supply hopper 41a thereof to chocolate shells S in the cavities 30a of each mold 30 when the shells S are brought to register and in proper alignment with the feeder 41 as seen in Fig. 1.

The syrup or juice supplier 42 may be of any well understood construction capable of delivering measuring quantities of syrup or juices from a reservoir 42a thereof to aligned shells S in mold cavities 30a thereunder, each shell then containing a cherry C received from the fruit feeder 41 when positioned as shown in Fig. 1.

The chocolate bud depositor 43 may also be of any well known construction to the extent that drops or buds D of chocolate are deposited from a mixer-container 43a of said depositor 43 through a valve block 43b onto a sheet 33 supported on a plate 31, said block 43b having nozzles 43c located to correspond with the spacing of the shells S of each row or line in mold cavities 30a as shown in Figs. 1 and 2.

The oven heater 44 may be of any standard type as for example, having a gas burner 44a enclosed in a casing 44b which extends over a portion of the conveyor 40 so that the molds 30 after being filled but before the bottom chocolate layers G are applied to close the filled shells S, have the mold top side 30b subjected to the heat in passing through the oven heater 44 as is seen from Fig. 1.

The sheet 33 on plate 30 is shaped like the top surface of the cavity side of the mold 30 but is slightly longer and wider, said sheet 33 preferably being made of a material or surfaced to have the chocolate buds D when deposited, spread out thereon and solidified on forming bottom closures G, readily removable without adhering to provide a smoothly finished surface. Said sheet 33 may be made with suitable means, such as spaced edge border openings 33a to fit a corresponding set of pins 32 carried by the plates 31 for detachably retaining the sheet 33 on the plate 31.

As one result of the invention the number of plates 31 required in the manufacturing operation has been greatly reduced and considerable labor has been saved due to the improved arrangement of automatically handling, that is, in turning the plates 31 carrying the sheets 33 and deposited chocolate layer G which operation heretofore was performed manually as described in my aforesaid patent. To this end there is provided a second endless conveyor 50, having spaced stationary side bars or rails 51, and spaced sprocket chains 52 movably mounted between said rails 51. The conveyor 50 extends part way the length of conveyor 40 and immediately thereover, the top length thereof passing under the chocolate depositor 43, as shown in Figs. 1 to 3. These chains 52 which pass over suitably positioned spaced sprocket wheels 53 and 54, may be intermittently driven by a suitable power transmission (not shown) through drive sprockets 54 in timed relation with the intermittent power drive of the conveyor 40 in the well understood manner.

Carried in uniform spaced relation by the conveyor chain 52 and secured to chain links 52a are a series of said plates 31 which in travelling with the conveyor chain 52 are successively presented to be positioned over the top or cavity side 30b of the mold 30, the latter being advanced by pusher-links 40c of the conveyor chains 40b as shown in Figs. 1 to 3.

The plates 31 used in conjunction with the moving molds 30 may be slightly larger than the top sides thereof, each plate 31 preferably being formed of rigid sheet material. Although said plates 31 are carried with conveyor chain 52 by said links 52a, they are also sufficiently releasably mounted to register in alignment with the molds 30 on conveyor 40. The purpose of this alignment is to positively position the bottom closure layer G on sheet 33 over the shells S carried in the cavities 30 of each mold 30. As here shown, the spaced pins 32 to which the sheet 33 is attached may be made to upstand from each of the plates 31 and when in said alignment are fitted into spaced holes 30c which extend in from the top side 30b of the mold 30. See Figs. 4 to 6.

In practising the invention the drops or buds D are made of sufficient chocolate in quantity to provide the formation of bottom closures of the finished product, said formation being accomplished through a "forced spreading" by the use of a shaker or vibrating means denoted generally at 45, as shown in Fig. 3, and actuated in cooperation with the upper portion of the conveyor chains 52 which has passed the chocolate depositor 43.

The above described apparatus embodying the invention operates as follows:

After the cells or cavities 30a of molds 30 are coated with cup shaped chocolate shells S to provide the sides and tops of the confection product being made, by any well understood process, said cavity-chocolate coated molds 30 are placed between the L-shaped rails 40a of the conveyor 40 at the end thereof marked A as shown in Fig. 1, one at a time. The conveyor chains 40b moving intermittently in the direction indicated by the arrow, slideably carries the leading coated mold 30 under the fruit feeder 41. Upright pusher chain links 40c uniformly spaced along the chains 40b engage successive molds 30 carrying the latter along in the movement thereof. Said rails 40a and the pusher links 40c positively control the path of movement and spacing of successive molds 30. The drive of the chains 40b with the pusher links 40c being intermittent, there is a dwell or rest period in the progressive movement arranged to occur when the leading mold 30 reaches a position under the fruit feeder 41. At that time cherries C drop out into the shells S in the mold cavities 30a.

The conveyor 40 then continues to advance and when the leading mold 30 with the shells S and cherries C reach a position under the syrup supplier 42 there occurs another dwell and a measured quantity of syrup J from the reservoir 42a is allowed to pass through a valve block 42b and be distributed by spouts 42c to all the shells S concurrently. The quantity of syrup supplied to each shell S may be approximately three quarters the contents thereof so that after sealing said shells S the finished product will be short of being completely filled.

The conveyor as it continues to advance the molds 30 with the shells S each filled with a cherry C and syrup J pass through the oven heater 44. Each mold 30 and contents are heated to precondition the upper portions of the shells S for the step of sealing same, the heat absorbed by said mold and contents being sufficient to retain such conditioning until the application of the closure bottoms G, in the manner hereinafter described.

The construction, arrangement and relative locations of the devices comprising the fruit feeder 41, juice supplier 42, chocolate depositor 43 and oven heater 44 are such that the dwells occur for simultaneous operation, that is, for the fruit feeder 41, juice supplier 42 and oven heater 44 occurring in the line of successive molds 30 with said molds located in alignment with each of the latter along the path of movement of the conveyor 40, and as for the chocolate depositor 43 occurring in the line of successive plates 31 with sheets 33 thereon carried by the conveyor 50. The application of heat for preconditioning the product in the molds 30 takes place just before the plates 31 with the sheets 33 and the "force spread" layers G are turned to face and are positioned over the filled shells S carried in the molds 30 on the conveyor 40.

As the chocolate depositor 43 drops buds D on the sheets 33 passing thereunder, said buds D are changed to the interconnecting circular-shaped wafer thin bottom closure G, the latter then being of sufficient size to provide a complete sealing wall for all the filled shells S of each mold 30. The "forced spreading" of the buds D takes place while the buds D on the sheet 33 are in a plastic state and is accomplished through the operation of the vibrator 45 on the chain 52 and plate 31 in the same manner as described and shown for the installation in said Patent No. 2,163,579.

When each of the plates 31 carrying said bottom layer G passes beyond the vibrator 45, it reaches the end E of conveyor 50 and is turned from an upwardly facing position to face downwardly toward the cavity side 30b of the filled molds 30 being advanced by the conveyor 40 and for travelling in the same direction and in alignment therewith.

The speeds, dwelling periods and spacings of the molds 30 on the conveyor 40 being relatively identical with those of the plates 31 being advanced by the conveyor 50, the chains 52 may be operated with a slight slack so that the lower portion thereof with the plates 31 sag a little permitting the pins 32 on turning of a plate 31 to be eased into entering the holes 30c of the underlying mold 30 thereby positively aligning, that is, matching the bottom closure layer G on the sheet 33 to properly register with the filled open shells S in the mold 30, as is clearly shown in Fig. 3. Said lower portions of chains 50 are so positioned that the closure layer G is then slightly above the upper level of the mold 30 and as the layer G matching with said filled shells S are advanced in unison the layer G is forced down into sealing position.

To assure that the plates 31 are more positively brought into close covering position for forcing the layer G into said sealing position, a pressure roller 55 may be provided, and located inwardly from the forward end F of the conveyor 50, as shown in Figs. 2 and 6, to exert an additional downward pressure on the plates 31 before the latter leave their matching position at the conveyor end F.

The conveyor 40 extends beyond conveyor end F and the filled molds with the bottom layers G covered now with only the flexible sheets 33 applied thereto, the plates 31 having been removed, continue to advance, and pass under a suitable pressure roller 56, as shown in Figs. 2 and 7. Here the flexible sheets 33 are flexed to permit successive portions of the bottom layers G to be pressed firmly into making a sure and positive sealed closure for said filled shells S.

The operations of the apparatus above described take place while the mold 30 is still in preconditioned state and the bottom layer G sufficiently plastic to fuse with the shells S.

The conveyor 50 meanwhile has lifted the plate 31 and removed the same from the sheet 33, the pins 32 projecting from the plate being eased out of the mold holes 30c as the plates 31 are advanced to be again turned over when separated from the molds 30 after leaving the conveyor end F. Each plate 31 on being lifted off the mold 30 leaves the sheet 33 covering the closure layer G, as shown in Fig. 2. When however the plates 31 again face upwardly, that is, along a horizontally extending portion of conveyor 50, as at H, another sheet 33 may be placed in position with the holes 33a thereof fitted over the plate pins 32. As is seen in the drawing, the latter serve to retain the sheet 33 in place and permit the ready detachment thereof as described above after the plates 31 are lifted away from the molds 30. In order that the sheets 33 positively remain in position on the plates 31 while carrying the bottom layer G particularly when said plates 31 are being turned over at the conveyor end E, a suitable guard means, such as guide member 57, may be provided for retaining the edges of said sheets 33 and preventing the latter from accidentally leaving the plates 31, as shown in Fig. 3.

The molds 30 after leaving the roller 56 may have the flexible sheets 33 removed therefrom for inspection and for permitting the fixing up of any imperfections found in the closure layer G or the sealed joints formed thereby with the shells S, said removal of the sheets 33 being carried out after the molds 30 have been cooled sufficiently to permit the chocolate contents thereof to set or harden.

In quantity production, the installation such as shown in Fig. 1, the conveyor 50 made long enough to allow time for the chocolate bottoms G and the sealed closure joints to set, that is, to become substantially solid, said conveyor being passed through a suitably constructed cooling tunnel device T. When each of the filled molds 30 with the sealed shells S reach the end H of the conveyor 50, the molds are slid onto a table top U, where the flexible sheets 33 are removed from the hardened bottom layer G for the inspection of the sealed closures as aforementioned, after which the uncovered molds may again be passed through the cooling tunnel device T from which they are unloaded at K and emptied of the completed finished products in the same manner as described in said Patent No. 2,163,580.

It has been found desirable to partition off various devices of the apparatus hereinabove described so as to segregate those which operate best at a higher room temperature from those working best in relatively lower temperature surroundings. In Fig. 1, a wall W is shown to indicate that the devices to the left are best operated at a higher room temperature in order to retain the preconditioning of the chocolate shells S and the bottom layer G, and the portion of devices and cooling tunnel T to the right of said wall W are best operated at a lower room temperature to cause the hardening of the chocolate portions of the product being manufactured. The mid-portion of conveyor 40 passes through the wall W as shown in Fig. 1.

It is thus seen that the invention when incorporated in apparatus such as described for making confections is greatly simplified in construction, requires less labor, and consequently is more efficient to meet the conditions of known practical use thereby achieving the several objects set forth.

As various other possible embodiments of the invention might be made use of, and as various changes in the embodiment above set forth, it is to be understood that all matters herein set forth or shown in the accompanying drawings and described in the specification is to be interpreted as new, and desire to secure by Letters Patent:

Having thus described my invention, I claim as new, and desire to secure by Letter Patent:

1. In a confection making apparatus, a plurality of multi-cavity molds, means for intermittently moving said molds in succession in a horizontal path to spaced apart stations for filling the cavities of each mold, a plurality of carriers for applying closures on the mold cavities, additional means for moving said carriers in succession identical with said movement of the molds partway in opposite direction thereto and in timed relation therewith in upwardly turned and downwardly turned positions, means for depositing material to form said closures on the carriers while the latter are in upwardly turned positions, said carrier moving means extending part way along the path of movement of the mold moving means, and means for pressing the carriers individually while in downwardly turned positions toward the molds for transferring the closure material to cover the mold cavities.

2. The confection apparatus defined in claim 1 which includes positive registering means for disengageably interconnecting the carriers with the molds during said transferring of the closure material.

3. A mechanism of a confection making apparatus comprising, a plurality of multi-cavity molds having a shell of a product lining each cavity, a first endless conveyor for intermittently moving said molds in separated succession in a path under spaced apart stations for filling the shells in said mold cavities, plates each having a flexible sheet demountably positioned thereon for carrying a deposited closure layer to be applied over said mold cavities in providing bottoms for the filled shells, a second endless conveyor extending partway along the path of movement of said first conveyor to which the plates are attached in separated succession identically spaced with the separation of the moving molds and in timed relation therewith for positioning the layer on each sheet in registered alignment with the mold cavities, and pressure means coacting with the second conveyor and each plate when in said registered alignment for transferring the layer on each of said sheets into an effective position to provide the bottoms as closures on the filled shells in each of said mold cavities.

4. The mechanism defined in claim 3 including means positioned along the path of movement of the molds on the first conveyor and beyond the second conveyor for pressing the flexible sheet covering to positively seal said bottom closures.

5. A mechanism of a confection machine comprising a plurality of multi-cavity molds having a shell of a product lining each cavity, a first horizontally extending conveyor for intermittently moving said molds along the upper length thereof in separated succession in a path under spaced apart stations for filling the shells in said mold cavities, plates each having a flexible sheet demountably positioned thereon for carrying a closure layer to be applied over said mold cavities in providing bottoms for the filled shells, a horizontally disposed second conveyor extending part way along the length of said first conveyor to which the plates are attached throughout the length thereof with said plates spaced the same distance apart as the moving molds on the first conveyor and moving in timed relation therewith for positioning the layer on each sheet in registered alignment with the mold cavities, means for depositing said layer on each sheet while the latter passes along an upper length of said second conveyor, and roller means positioned to apply pressure through each plate and sheet to the layer when in said registered alignment while the plate passes along a lower length of the second conveyor for transferring the layer covered by the sheet to provide the bottoms as closures on the filled shells in said mold cavities passing under the second conveyor.

6. The mechanism defined in claim 5 including a roller positioned along the path of movement of the molds on the upper length of said first conveyor and beyond the second conveyor for exerting pressure on the flexible sheet covering said layer to positively seal said bottom closures.

7. The mechanism defined in claim 5 in which vibrating means are provided for the plates along the upper length of the second conveyor for "force spreading" the deposit forming the layer on said sheet into a wafer thin body.

8. The mechanism defined in claim 5 including a roller positioned along the path of movement of the molds on the upper length of the first conveyor and beyond the second conveyor for exerting pressure on the flexible sheet covering said layer to positively seal said bottom closures, and in which the first conveyor is extended sufficiently beyond said roller to provide space and to locate a cooling tunnel through which the molds with the sealed shells on said first conveyor pass through for solidification.

9. The mechanism defined in claim 5 in which said plates each have spaced projecting pins upstanding therefrom for engaging with the sheet, and said molds are provided with holes into which the pins are inserted and withdrawn before and after, respectively, said roller pressure exerting means are effective for assuring said registration of alignment.

10. In a confection making machine, in combination a plurality of flat supports adapted to cooperate with multi-cavity molds, said supports being constructed and arranged to retain closure material deposited in a plastic state for shells formed in the cavities of said molds, a first conveyor for moving said molds with the shells in the cavities successively along a path to spaced apart stations for filling said shells, a second conveyor extending along a portion of the path of movement of said molds having means attaching said supports for moving the latter successively in the same spaced and timed relation as the moving molds on the first conveyor, and pressure means for actuating said supports individually while being moved by the second conveyor for transferring said closure material to cover the shells in the mold cavities.

11. The confection machine as defined in claim 10 which includes means for successively pressing the closure material covering the shells in the mold cavities to seal the same during and after said transfer of the material.

12. The confection machine as defined in claim 10 which includes means for releasably engaging each support to a mold during the said transferring of the closure material to cover the shells in the mold cavities.

13. The confection machine as defined in claim 10 in which said second conveyor moves the supports horizontally, means for depositing said closure material with the supports in an upwardly facing position, means to vibrate the supports for spreading said closure material deposited, positioned under said depositing means, said second conveyor positioning the supports in a downwardly position while the transferring means are effective, means for releasably engaging each support to a mold during said transferring of the closure material to cover the shells in the mold cavities, and means for pressing said supports to seal said shells in the mold cavities with the closure material.

HENRY E. BIANCHI.

REFERENCES CITED

The following references are of record in the file of this patent:

UNITED STATES PATENTS

| Number | Name | Date |
|---|---|---|
| 1,790,361 | Winkler et al. (1) | Jan. 27, 1931 |
| 1,894,077 | Winkler et al. (2) | Jan. 10, 1933 |
| 2,163,580 | Bianchi | June 27, 1939 |